(12) United States Patent
Reese et al.

(10) Patent No.: US 11,747,112 B2
(45) Date of Patent: Sep. 5, 2023

(54) FIREARM SIGHTS AND ASSEMBLIES

(71) Applicant: Springfield, Inc., Geneseo, IL (US)

(72) Inventors: Dennis J. Reese, Geneseo, IL (US); Stephen H. McKelvain, Geneseo, IL (US); Nick Ballard, Galva, IL (US); Peter J. Leach, Davenport, IA (US)

(73) Assignee: Springfield, Inc., Geneseo, IL (US)

( * ) Notice: Subject to any disclaimer, the term of this patent is extended or adjusted under 35 U.S.C. 154(b) by 0 days.

(21) Appl. No.: 17/660,310

(22) Filed: Apr. 22, 2022

(65) Prior Publication Data

US 2022/0244016 A1   Aug. 4, 2022

Related U.S. Application Data

(63) Continuation of application No. 17/651,701, filed on Feb. 18, 2022, which is a continuation-in-part of application No. 29/771,512, filed on Feb. 23, 2021, and a continuation-in-part of application No. 29/760,143, filed on Nov. 30, 2020, now Pat. No. Des. 963,780.

(51) Int. Cl.
*F41G 1/30* (2006.01)
*G02B 23/16* (2006.01)

(52) U.S. Cl.
CPC ............... *F41G 1/30* (2013.01); *G02B 23/16* (2013.01)

(58) Field of Classification Search
CPC .................................. F41G 1/30; G02B 23/16
See application file for complete search history.

(56) References Cited

U.S. PATENT DOCUMENTS

| | | |
|---|---|---|
| D413,645 S | 9/1999 | Sheehan |
| D420,088 S | 2/2000 | Sheehan |
| D429,789 S | 8/2000 | Sheehan |
| D450,800 S | 10/2001 | Sheehan |
| 6,327,806 B1 * | 12/2001 | Paige ..................... F41G 1/30 42/130 |
| D460,512 S | 7/2002 | Sheehan |
| 7,634,866 B2 | 12/2009 | Javorsky |
| D612,006 S | 3/2010 | Koehler |
| D618,756 S | 6/2010 | Koehler |

(Continued)

FOREIGN PATENT DOCUMENTS

DE    10 2017 128 920 A1    6/2019

OTHER PUBLICATIONS

Ammoland, DARC Micro Pistol dot from Sousa Optics, Retrieved May 24, 2022.

(Continued)

*Primary Examiner* — Joshua E Freeman
(74) *Attorney, Agent, or Firm* — Woodard, Emhardt, Henry, Reeves & Wagner, LLP

(57) ABSTRACT

Sights of the present disclosure comprise a housing supporting an optical sighting element, such as one or more lenses or iron sights. A first lateral side of the housing has a laterally-extending protrusion and a lead-in portion forward of the laterally-extending portion. In some arrangements the lead-in portion is laterally-inward of an outermost surface of the laterally-extending protrusion and has a surface roughness of less than 50 μm. In some instances, the laterally-extending protrusion has a width of at least 1 mm and the lead-in portion has a length of at least five times the width of the laterally-extending protrusion.

23 Claims, 17 Drawing Sheets

(56) References Cited

U.S. PATENT DOCUMENTS

| | | | |
|---|---|---|---|
| D662,566 S | | 6/2012 | Estes |
| D667,524 S | * | 9/2012 | Glimpse ................ D22/109 |
| 8,443,541 B2 | | 5/2013 | Elpedes et al. |
| D747,431 S | | 1/2016 | Cheng et al. |
| D784,480 S | | 4/2017 | Oz et al. |
| 9,752,853 B2 | | 9/2017 | Teetzel et al. |
| D801,468 S | | 10/2017 | Kedairy |
| D819,161 S | | 5/2018 | Kedairy |
| D837,927 S | | 1/2019 | Trulsson |
| 10,175,029 B2 | | 1/2019 | Teetzel et al. |
| D846,689 S | * | 4/2019 | Cheng .................... D22/109 |
| D846,690 S | | 4/2019 | Cheng et al. |
| D847,292 S | * | 4/2019 | Hoff ...................... D22/109 |
| D848,567 S | | 5/2019 | Soejima |
| D849,180 S | | 5/2019 | Cheng et al. |
| 10,302,396 B1 | * | 5/2019 | Ray ....................... F41G 1/473 |
| D856,458 S | | 8/2019 | Cheng et al. |
| D856,459 S | | 8/2019 | Hamilton et al. |
| D857,145 S | * | 8/2019 | Hillman ................. D22/109 |
| D869,594 S | | 12/2019 | Lance et al. |
| D869,596 S | | 12/2019 | Huston |
| D872,219 S | * | 1/2020 | Horton ................... D22/109 |
| D875,875 S | | 2/2020 | Jung et al. |
| 10,563,955 B2 | | 2/2020 | Paiel et al. |
| D877,847 S | * | 3/2020 | Vail ....................... D22/109 |
| D882,716 S | | 4/2020 | Connolly |
| D895,052 S | * | 9/2020 | Johnston ................ D22/109 |
| D895,760 S | * | 9/2020 | Johnston ................ D22/109 |
| D906,465 S | * | 12/2020 | Horton ................... D22/109 |
| 10,907,932 B2 | | 2/2021 | Curry |
| 11,009,314 B2 | | 5/2021 | Courtice |
| 11,067,362 B1 | * | 7/2021 | Chin ...................... F41G 1/30 |
| D960,278 S | | 8/2022 | Lance et al. |
| D963,780 S | | 9/2022 | McKelvain et al. |
| 2010/0024274 A1 | * | 2/2010 | Lippard ................. F41A 19/43 42/70.05 |
| 2011/0314721 A1 | * | 12/2011 | Lamb ..................... F41G 1/10 42/145 |
| 2012/0144721 A1 | * | 6/2012 | Glimpse ................ F41G 1/32 42/144 |
| 2012/0151816 A1 | | 6/2012 | Koeck et al. |
| 2013/0255129 A1 | * | 10/2013 | Curry .................... F41G 1/425 42/144 |
| 2014/0109456 A1 | | 4/2014 | Jung et al. |
| 2015/0198415 A1 | * | 7/2015 | Campean ............... F41G 1/30 42/137 |
| 2019/0186870 A1 | * | 6/2019 | Barnett .................. G02B 7/24 |
| 2020/0232759 A1 | * | 7/2020 | York ...................... F41G 1/30 |
| 2021/0116213 A1 | * | 4/2021 | York ...................... F41G 1/30 |
| 2021/0207928 A1 | | 7/2021 | Brewer et al. |
| 2021/0231407 A1 | * | 7/2021 | Salinas .................. F41A 21/36 |
| 2021/0293510 A1 | * | 9/2021 | Rosen .................... F41G 11/00 |
| 2022/0170718 A1 | | 6/2022 | Reese et al. |

OTHER PUBLICATIONS

Ammoland, EAA Corp. New MC9 Pistol, Retrieved May 24, 2022.
Canik New Red Dot Sight Pistol for Mecanik Review, YouTube, Retrieved May 24, 2022.
CT Rad Micro PRO, YouTube, Retrieved May 24, 2022.
Mepro Foresight, YouTube, Retrieved May 24, 2022.
Mepro M5, YouTube Video, Retrieved May 24, 2022.
Mepro RDS Series, YouTube Video, Retrieved May 24, 2022.
Academy Website Red Dot Sights, Retrieved Apr. 20, 2022 https://www.academy.com/c/outdoors/hunting/optics/red-dot-sights.
Academy Website Reflex Sights, Retrieved Apr. 20, 2022 https://www.academy.com/c/outdoors/hunting/optics/red-dot-sights/reflex-sights?&page_1.
English Translation of DE 10 2017 128 920, retrieved Mar. 8, 2021.
Holographic Sights Academy, Holographic Sights, Retrieved Apr. 20, 2022 https://www.academy.com/c/outdoors/hunting/optics/red-dot-sights/holographic-sights.
Holsun Open Reflex sight, Retrieved Apr. 20, 2022 https://www.youtube.com/watch?v=XWJCxSJzf-l.
Leupold Deltapoint Pro Red Dot Sights, Retrieved Apr. 20, 2022 https://www.leupold.com/shop/red-dots/series/deltapoint-pro.
Meprolight Foresight Reflex Optic Web Page, Retrieved Apr. 20, 2022 https://www.shootingillustrated.com/content/review-meprolight-foresight-reflex-optic/.
Meprolight Website for Optics and Sights, Retrieved Apr. 20, 2022 https://www.meprolight.com/product_cat/optics/?filc&ma=11.
NCStar Website, VISM Microdot Reflex Optic with Quick Release, Retrieved Apr. 20, 2022 https://www.ncstar.com/optics-acc/reflex-optics/micro-dot/vddabkm-vism-dotddabrdkeymodblk.
Optics Den Webpage with Dagger Defense, Retrieved Apr. 20, 2022 https://www.opticsden.com/best-reflex-sights/.
Optics Planet.com Website, Steiner HT QD 1913 Mount, Retrieved Apr. 20, 2022 https://www.opticsplanet.com/steiner-ht-qd-1913-mount-for-r1x.html.
Reflex Optics Web p. 1, Retrieved Apr. 20, 2022 https://www.ncstar.com/optics-acc/reflex-optics/20/1/1/.
Reflex Optics Web p. 2, Retrieved Apr. 20, 2022 https://www.ncstar.com/optics-acc/reflex-optics/20/1/2/.
Sig Sauer Website, Reflect Optics, Retrieved Apr. 20, 2022 https://www.sigsauer.com/electro-optics.html?product_sub_category=1552.
VISM Flip Dot Red Dot Reflex Optic, Retrieved Apr. 20, 2022 https://www.ncstar.com/optics-acc/reflex-optics/micro-dot/vdflippro-flip-dot-prored-dotrmr-blk.
Web page for Trijicon Reflex/Red Dot sights, Retrieved Apr. 20, 2022 https://www.trijicon.com/products/category/reflex-red-dot-sights/.

* cited by examiner

FIREARM SIGHTS AND ASSEMBLIES

BACKGROUND OF THE INVENTION

The present disclosure pertains generally to sights for firearms and assemblies of both. More specifically, the present disclosure pertains to optical firearm sights, such as reflex optics.

Reflex optics are a type of firearm sight that is often mounted to the slide of a firearm (e.g., a pistol). A reflex optic has a light emitter (e.g., an LED or laser) and a reflective transparent element (e.g., a lens such as a glass plate which may have a coating). The light emitter directs light towards the reflective transparent element which, in turn, reflects the light towards the direction of the shooter. When shooting the firearm, the shooter looks through the reflective transparent element and uses the reflected light to aim the firearm.

Reflex optics are popular as they can be configured to reduce the effects of parallax and can also allow for a shooter to see more of the target as compared to other sighting devices, such as iron sights. Reflex optics, however, often obstruct part of the slide of the firearm. Additionally, as reflex optics typically extend upwards from the top of the firearm, they can frustrate efforts by a shooter to grasp the slide of the firearm from above—as some shooters may need to do to remove and/or load a cartridge in the firearm during operation. Accordingly, there is a need for improvement in this field.

SUMMARY OF THE INVENTION

The present disclosure pertains generally to sights for firearms. More specifically, the present disclosure pertains to optical firearm sights having a lens and/or an iron sight contained therein. In particular instances, the present disclosure relates to reflex optics (e.g., reflector sights). Reflex optics may be with or without magnification.

Sights of the present disclosure comprise a housing supporting an optical sighting element, such as one or more lenses or iron sights. The housing has a forward end, a rearward end, a top side, a bottom side, a first lateral side and a second lateral side. At least the first lateral side extends between the forward and rearward ends of the housing.

The lens is transparent or semi-transparent. The lens may comprise glass and/or polymer material. The lens may have a coating to aid in the reflection of the LED or laser towards the eye of a shooter. The lens may have magnification and/or may include a series of lenses for magnification. The lens may not have magnification.

The housing has a length, a width, and a height. The length extends along a longitudinal axis of the housing along a direction from the forward end to the rearward end. The width extends along a direction from the first lateral side to the second lateral side. And, the height extends along a direction from the bottom side to the top side. Preferably the length of the housing is greater than the width of the housing. More preferably, the length of the housing is at least 1.5 times the width of the housing. The width of the housing may be at least 20 mm. The length of the housing may be at least 40 mm. The height of the housing may be at least 7 mm. More preferably the height of the housing is at least 20 mm. The housing may be monolithic or may comprise multiple components.

The first lateral side includes at least one laterally extending protrusion. When the optical sighting element is a lens, the laterally extending protrusion is preferably positioned between the lens and the rearward end of the housing. When the optical sighting element is an iron sight, the laterally extending protrusion is preferably positioned between the iron sight and the forward end of the housing. The laterally extending portion is preferably positioned at least 5 mm rearward of the forward-most end of the housing.

The laterally extending protrusion may have a forward-facing surface and a rearward-facing surface. Preferably the forward-facing surface of the laterally extending protrusion is concave towards the forward end of the housing. The forward-facing surface and rearward-facing surface may not be parallel to one another. The rearward-facing surface of the laterally extending protrusion may taper inwardly towards the housing along a direction from the forward end to the rearward end of the housing.

Preferably the forward-facing surface of the laterally extending protrusion is transverse to a longitudinal axis of the housing. More preferably, the forward-facing surface of the laterally extending protrusion is orthogonal to the longitudinal axis of the housing. The forward-facing surface may be parallel to a forward-facing surface of the forward end of the housing and/or a rearward-facing surface of the rearward end of the housing.

The laterally extending protrusion has a height measured along a direction from the bottom side of the housing to the top side of the housing. The laterally extending protrusion has a width measured along the forward-facing surface of the laterally extending protrusion and along a direction from the first lateral side of the housing to a second lateral side of the housing. And, the laterally extending protrusion has a length measured between the forward-facing surface and the rearward-facing surface along a direction from the rearward end of the housing to the forward end of the housing.

The height of the laterally extending protrusion is preferably greater than the width and the length of the protrusion. The length of the protrusion is preferably greater than the width of the protrusion. The laterally extending protrusion preferably has a maximum width of at least 1 mm.

Positioned forward of the laterally extending protrusion is a lead-in portion. The lead-in portion preferably does not extend laterally outward beyond an outermost surface of the laterally extending protrusion. For example, the lead-in portion is preferably positioned laterally inward of an outermost surface of the protrusion. The lead-in portion is preferably free of protrusions having a height and/or width greater than 0.1 mm. The lead-in portion preferably has a surface roughness of less than 50 mm.

The lead-in portion may extend the entirety of the height of the laterally extending protrusion. The lead-in portion may extend only a portion of the height of the laterally extending protrusion. Preferably, the lead-in portion has a height of at least 10 mm. More preferably the lead-in portion has a height of at least 15 mm.

The lead-in portion may be a planar surface. The lead-in surface may be parallel to the longitudinal axis of the housing.

The lead-in portion has a length measured along the direction from the forward end of the housing to the rearward end of the housing. The length of the lead-in portion is preferably at least 5 times the width of the laterally extending protrusion. More preferably, the length of the lead-in portion is preferably at least 6 times the width of the laterally extending protrusion. Preferably the lead-in portion has a length of at least 5 mm. More preferably, the lead-in portion has a length of at least 10 mm.

In embodiments comprising a lens, the housing preferably has a portion that extends at least partially around a perimeter of the lens. Preferably the portion extends at least halfway around the perimeter of the lens. The portion extending at least partially around the lens preferably extends forward and rearward of the lens to define openings forward and rearward of the lens.

The portion extending at least partially around the lens may have a forward-facing side, a rearward-facing side, a top surface, a first lateral outer surface, and a second lateral outer surface. The forward-facing and/or rearward-facing sides may be oblique to the forward-end and/or rearward-end of the housing. Preferably, the portion extending at least partially around the lens extends up and over the top of the lens.

The rearward end and/or rearward-facing side of the housing preferably includes serrations. The serrations preferably reduce glare that may be directed toward an eye of a shooter of the firearm (e.g., anti-glare serrations). The serrations may comprise a series of elongate peaks separated by elongate valleys. The peaks may be truncated. Truncated peaks may define flat surfaces extending parallel to the rearward end and/or rearward-facing side of the housing.

Serrated surfaces of the housing are preferably not coplanar with one another. More preferably, serrated surfaces of the housing are oblique to one another. Additionally or alternatively, serrated surfaces of the housing may be spaced from one another (e.g., spaced apart along the length of the housing). Advantageously, such arrangements can aid in dispersing light that reflects from the housing so as to reduce the total illuminance that may reach a shooter's eye in the event of a glare.

Peaks of the serrations may be defined by a first peak side surface and a second peak side surface. The first and second peak side surfaces may transverse to one another. The first and second peak side surfaces may intersect. Preferably, the first and second peak side surfaces intersect at an angle of about 90 degrees. A side surface of one peak may intersect the side surface of an adjacent peak. Preferably, side surfaces of adjacent peaks intersect at an angle of about 90 degrees.

The peaks have a height as measured along a direction orthogonal to the rearward end or rearward-facing side of the housing. The peaks may have a width as measured along the rearward end or rearward-facing side along a direction from the bottom side of the housing to the top side of the housing. The height of the peaks may be less than or equal to the width of the peaks. Truncated peaks have a truncated surface having a width as measured along the rearward end or rearward-facing side along a direction from the bottom side of the housing to the top side of the housing. Preferably the width of truncated surfaces is equal to or greater than the height of the truncated peaks.

Between the peaks are valleys. Preferably the width of a valley adjacent a peak is equal to the width of the adjacent peak. For example, the width of a valley as measured along the rearward end or rearward-facing side along a direction from the bottom side of the housing to the top side of the housing is approximately equal to the width of an adjacent truncated peak.

The serrations may extend along a direction extending from the first lateral side or lateral outer surface to the second lateral side or lateral outer surface. Elongate peaks of serrations extending along the direction extending from the first lateral side or lateral outer surface to the second lateral side or lateral outer surface have a length measured along the direction extending from the first lateral side or lateral outer surface to the second lateral side or lateral outer surface.

As viewed by an operator aiming a firearm with a disclosed sight which may include the viewing of a reticle of the sight, the rearward end and/or rearward-facing side of the housing preferably include(s) serrations positioned at least partially around the optical sighting element. Preferably serrations are positioned below the optical sighting element as seen by a shooter aiming the firearm. More preferably, serrations are positioned below and on opposing lateral sides of the optical sighting element as viewed by a shooter aiming the firearm. Even more preferably, serrations are positioned below, on opposing lateral sides, and above the optical sight element as viewed by a shooter aiming the firearm. Serrations are preferably located on all sides of the optical sight element as viewed by a shooter aiming the firearm.

Serrations preferably cover at least 60% of the housing as it is visible to an operator aiming a firearm with a disclosed sight. More preferably, serrations cover at least 80% of the housing visible to an operator aiming a firearm with a disclosed sight.

Serrations may be located at different locations along the length of the housing. Preferably, serrations below the optical sight element (as viewed by a shooter aiming the firearm) are positioned rearwardly (relative to the length of the housing) of serrations positioned laterally of the optical sight element. Even more preferably, serrations positioned above the optical sight element (as viewed by a shooter aiming the firearm) are positioned forward of serrations laterally of the optical sight element.

Serrations positioned at different locations of the housing may have similar or different shapes and/or dimensions than other serrations. For example, serrations below the optical sight element may have the same peak height and/or width as serrations laterally of and/or above the optical sight element. Serrations positioned more rearwardly of the optical sight element may have a greater length than serrations nearer the optical sight element.

The first and/or second lateral outer surface may include at least a first slope extending downward and outward relative to the lens. The first lateral outer surface may also include a second slope extending downward and inward relative to the lens. The second slope is preferably positioned below the first slope. The housing preferably defines a battery cavity, one or more apertures for receiving one or more posts for aligning the housing to a firearm or an intermediate mounting plate, and/or one or more apertures for receiving one or more fasteners for securing the housing to the firearm or an intermediate mounting plate. The battery cavity is preferably accessible from the bottom side of the housing. The one or more apertures for posts are preferably accessible from the bottom side of the housing. And, the one or more apertures for fasteners are preferably accessible from the top side of the housing. Preferably, the battery cavity is preferably positioned between the one or more apertures for fasteners and the forward end of the housing.

The sight may include a button. The button may be positioned in and/or below the lead-in portion. The button can be configured to control a feature of the sight, such as the brightness of light being reflected from the lens. Preferably the button has a height and a width less than the corresponding height and width of the forward-facing surface of the laterally-extending protrusion.

Not limited to a particular embodiment, the housing may include laterally extending protrusions on one or both the first lateral side and the second lateral side. The first lateral side and/or second lateral side of the housing may include more than one laterally extending protrusion. Preferably, each laterally extending protrusion has a lead-in portion positioned forward of the laterally extending protrusion.

In arrangements having multiple laterally extending protrusions on the same lateral side of the housing, preferably the forward-facing surface of a first laterally extending protrusion is spaced at least 10 mm from the forward-facing surface of a second laterally extending protrusion on the same lateral side along the length of the housing. Preferably, at least one lead-in portion separates the first and second laterally extending protrusions of the multiple laterally extending protrusions.

The first and second lateral sides of the housing may include the same number of laterally extending protrusions or different numbers of laterally extending protrusions. Laterally extending protrusions on the first lateral side of the housing may be offset with laterally extending protrusions on the second lateral side of the housing. Preferably, however, a laterally extending protrusion on the first lateral side of the housing may align along the length of the housing with a laterally extending protrusion on the opposing, second lateral side of the housing. In such instances, the maximum width of the housing at the aligned laterally extending protrusions on opposing sides of the housing is preferably about 10% greater than at a lead-in portion preceding the laterally extending protrusions. In arrangements having aligned laterally extending protrusions on opposing sides of the housing, preferably the maximum width of the housing at the aligned laterally extending protrusions is at least 2 mm greater than at a lead-in portion preceding the laterally extending protrusions.

The present disclosure also contemplates firearm assemblies with the aforementioned sights. Firearms of the firearm assemblies may have a reciprocating slide. The slide may have one or more serrations and the sight may be mounted to the slide.

Firearm assemblies comprising the sights disclosed herein preferably have a laterally extending protrusion of the sight housing with a greater width than a corresponding width of a serration on a slide of the firearm assembly. Preferably, the laterally extending protrusion of the sight has a greater height than a corresponding height of the serration. Preferably, the laterally extending protrusion has a greater width and/or height than all of the serrations on the slide of the firearm. Preferably, the laterally extending protrusion extends laterally outward beyond the outermost surface of the serration. Advantageously, such arrangements can make it easier for an operator to grasp and, therefore, manually operate the slide of the firearm.

Firearm assemblies comprising the sights disclosed herein preferably have a laterally extending protrusion of the sight housing positioned above a serration on the slide of the firearm assembly. More preferably, the forward-facing surface of the laterally extending protrusion of the sight aligns with a forward-facing surface of the serration. For example, the forward-facing surface of the laterally extending portion preferably lies along an extension of the forward-facing surface of the serration. Similarly, the rearward-facing surface of the laterally extending protrusion of the sight preferably aligns with a rearward-facing surface of a serration. The rearward-facing surface of the laterally extending protrusion may align with the rearward-facing surface of a serration in addition to the forward-facing surface of the laterally extending portion aligning with the forward-facing surface of either the same or a different serration.

Further forms, objects, features, aspects, benefits, advantages, and embodiments of the present invention will become apparent from a detailed description and drawings provided herewith.

DESCRIPTION OF THE INVENTION

Figure 1:
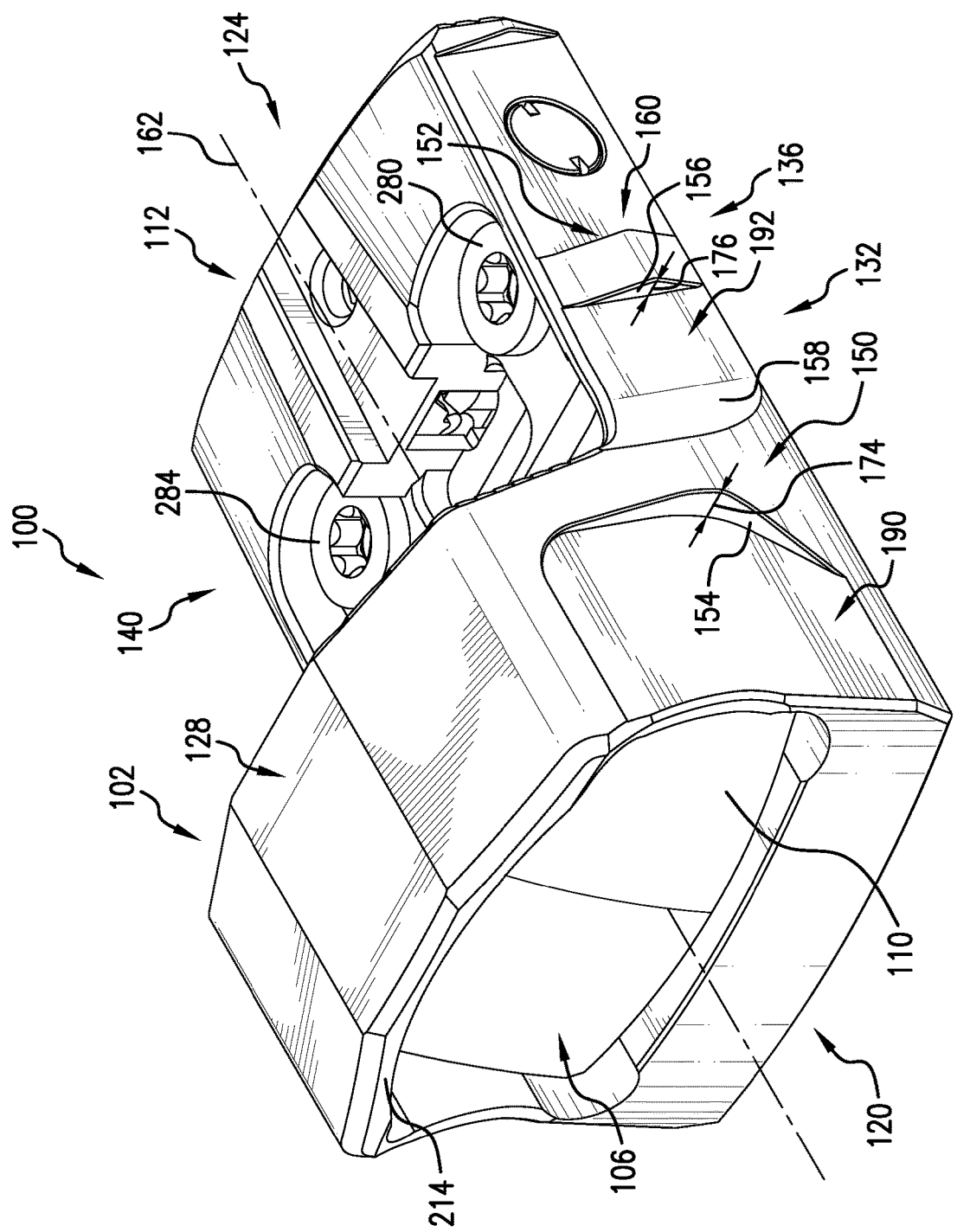
FIG. 1 illustrates a front left top perspective view of a sight for a firearm.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The present disclosure pertains generally to sights for firearms. More specifically, the present disclosure pertains to optical firearm sights having a lens and/or an iron sight contained therein. In particular instances, the present disclosure relates to reflex optics (e.g., reflector sights). Reflex optics may be with or without magnification.

Figure 2:
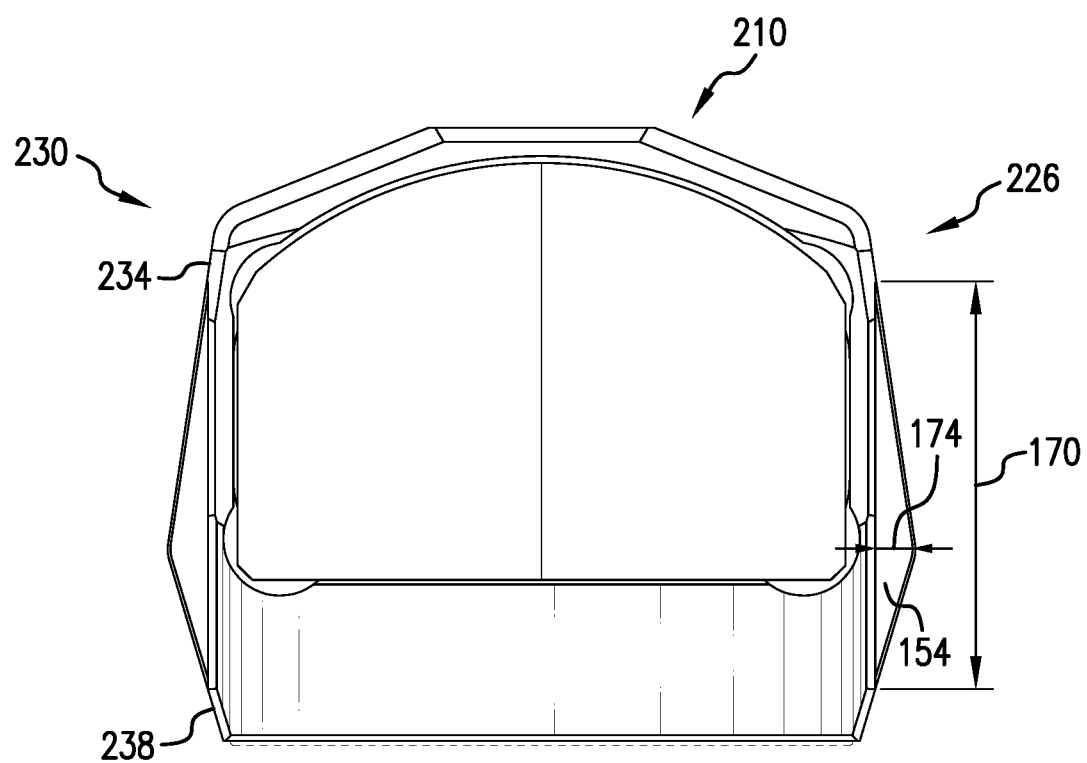
FIG. 2 illustrates a front view of the sight of FIG. 1.
Figure 3:
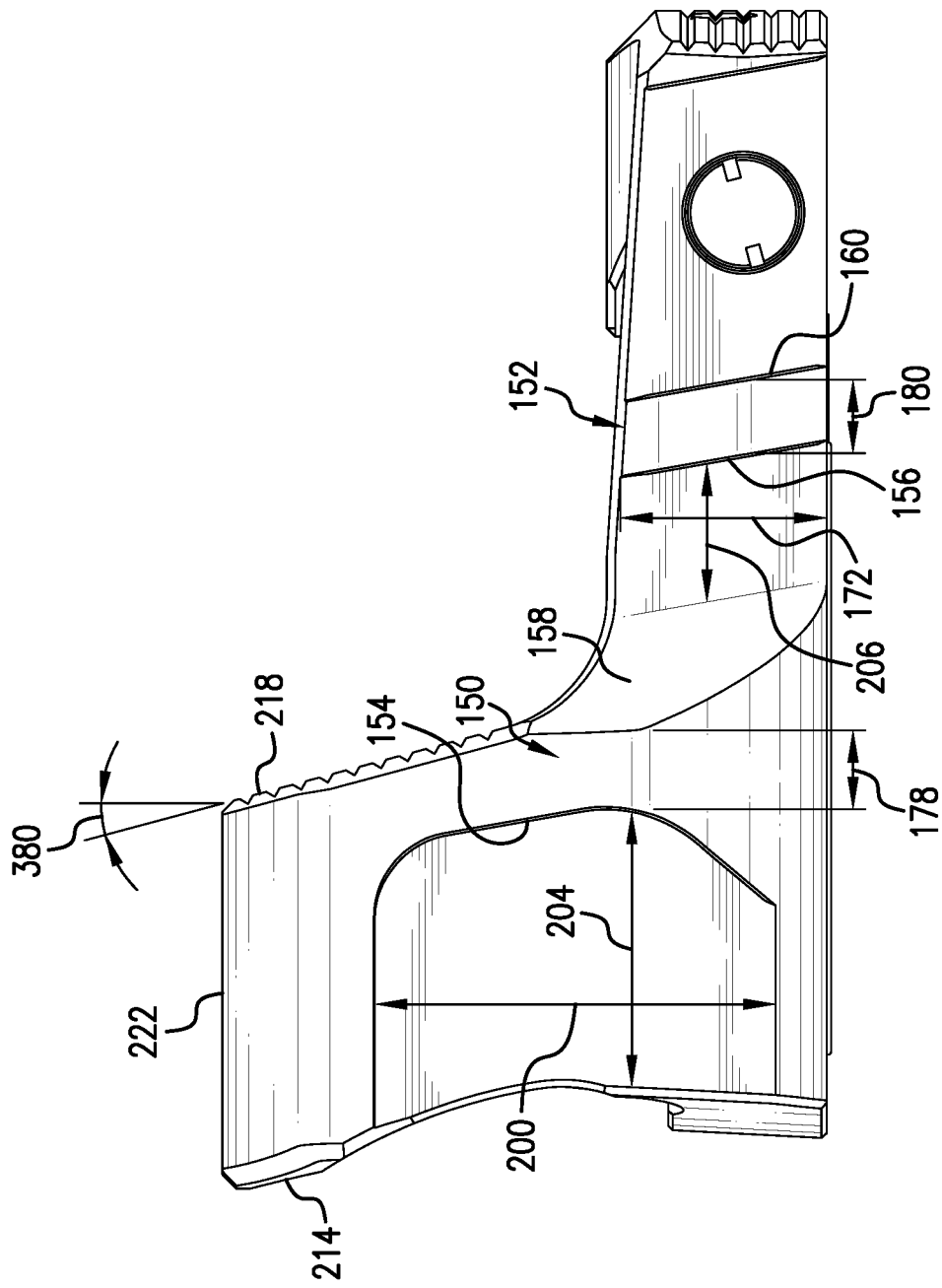
FIG. 3 illustrates a left side view of the sight of FIG. 1.
Figure 4:
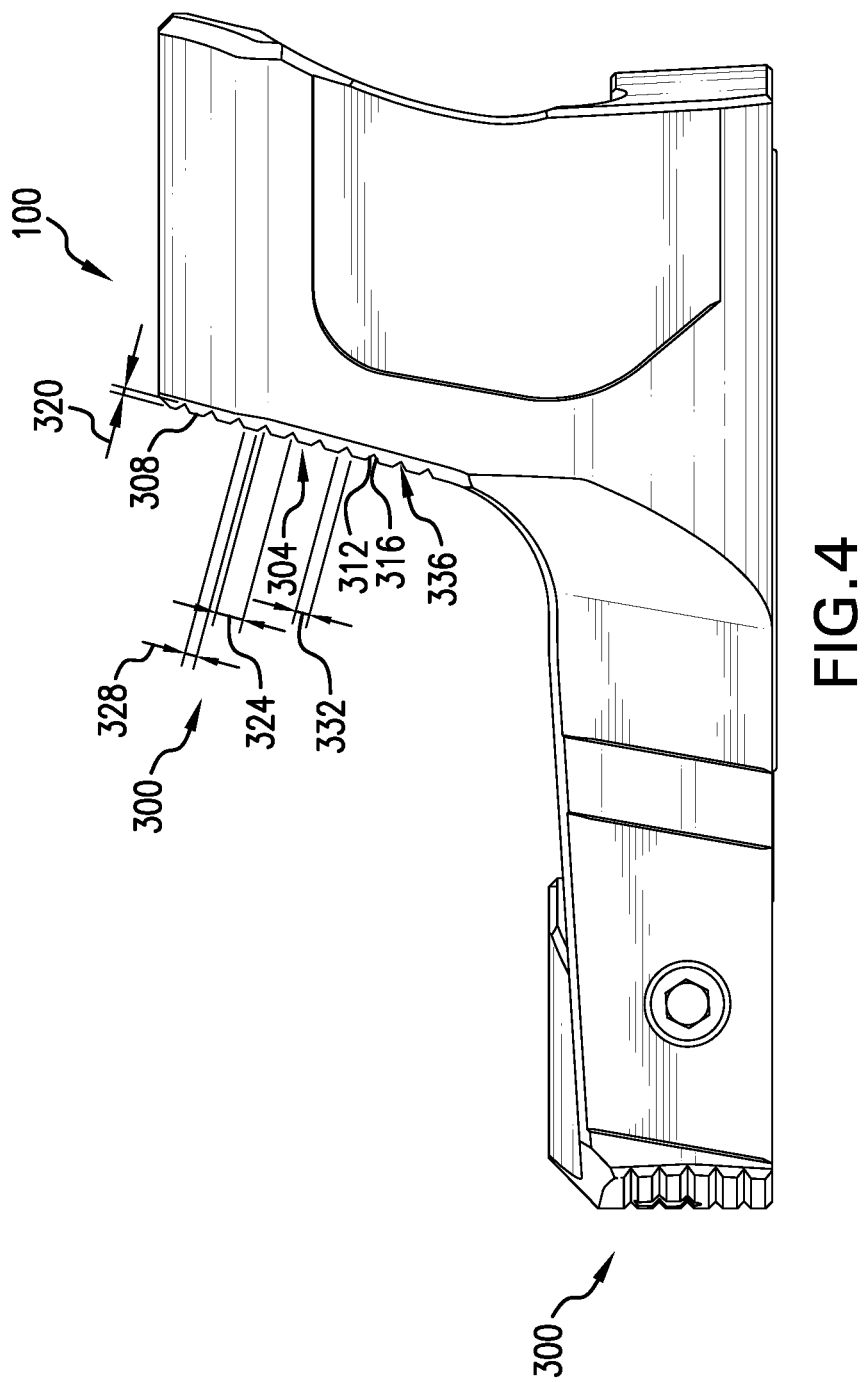
FIG. 4 illustrates a right side view of the sight of FIG. 1.
Figure 5:
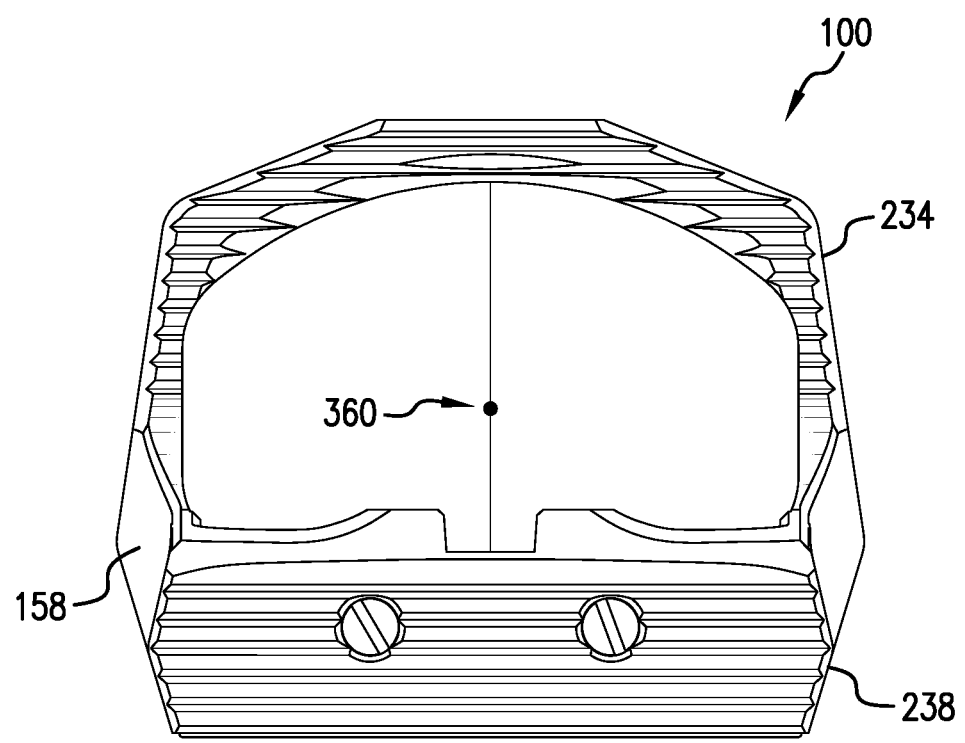
FIG. 5 illustrates a rear view of the sight of FIG. 1.
Figure 6:
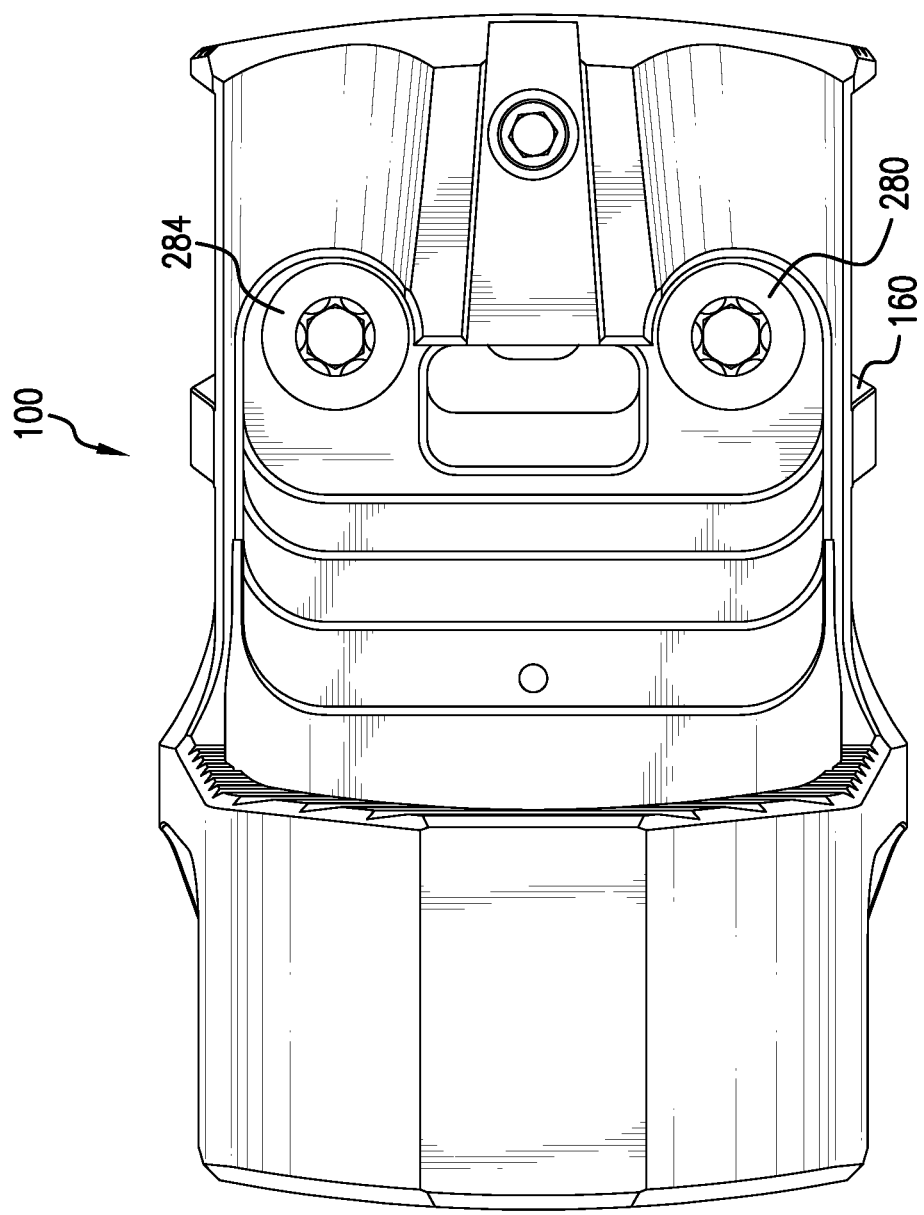
FIG. 6 illustrates the top of the sight of FIG. 1.
Figure 7:
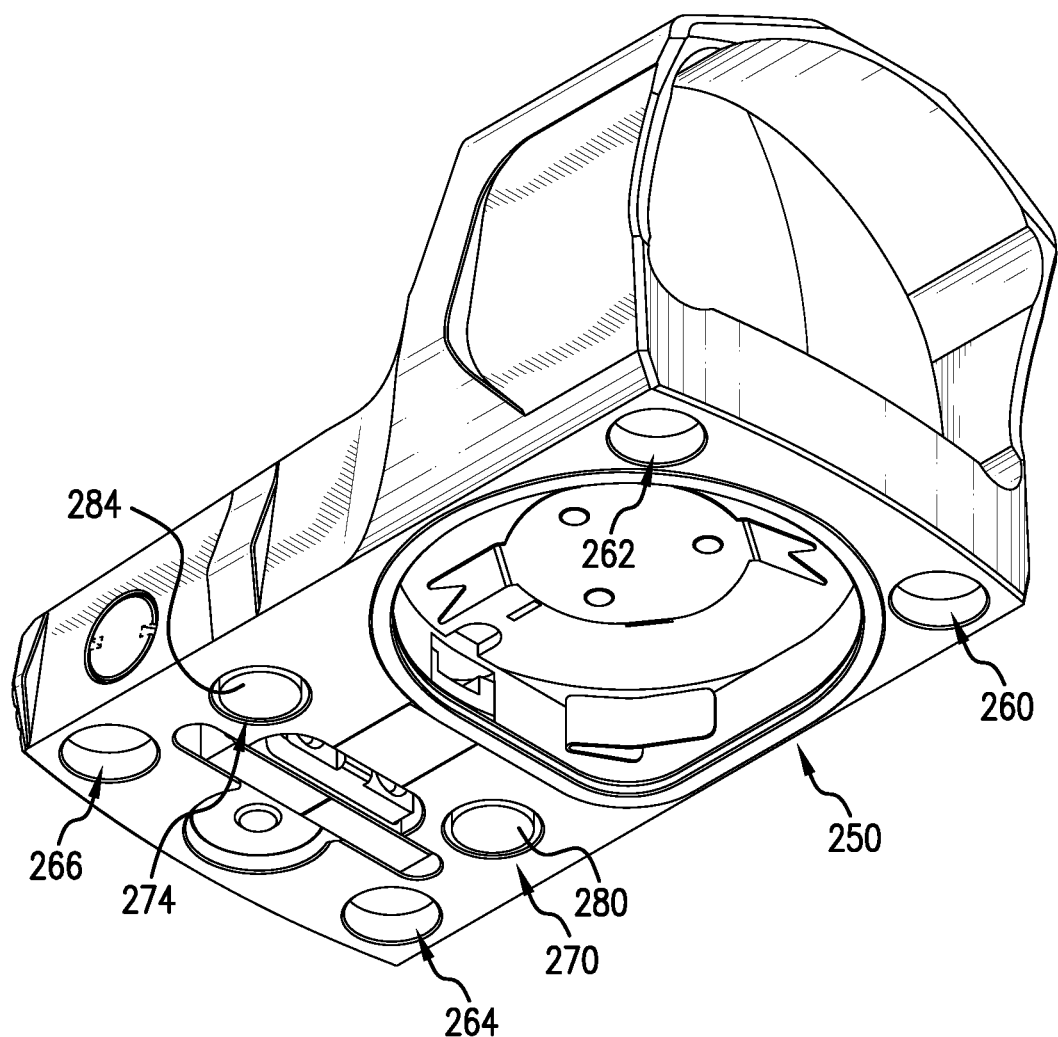
FIG. 7 illustrates a front bottom right perspective view of the sight of FIG. 1.

FIGS. 1-7 illustrate an exemplary sight of the present disclosure. The sight 100 comprises a housing 102 supporting an optical sighting element 106, such as one or more lenses 110 or iron sights 112. The housing has a forward end 120, a rearward end 124, a top side 128, a bottom side 132, a first lateral side 136 and a second lateral side 140. At least the first lateral side extends between the forward and rearward ends of the housing.

The housing has a length, a width, and a height. The length extends along a longitudinal axis of the housing along a direction from the forward end to the rearward end. The width extends along a direction from the first lateral side to the second lateral side. And, the height extends along a direction from the bottom side to the top side. Preferably the length of the housing is greater than the width of the housing. More preferably, the length of the housing is at least 1.5 times the width of the housing. The width of the housing may be at least 20 mm. The length of the housing may be at least 40 mm. The height of the housing may be at least 7 mm. More preferably the height of the housing is at least 20 mm.

The first lateral side includes at least one laterally extending protrusion 150, 152. When the optical sighting element is a lens, the laterally extending protrusion is preferably positioned between the lens and the rearward end of the housing. When the optical sighting element is an iron sight, the laterally extending protrusion is preferably positioned between the iron sight and the forward end of the housing. The laterally extending portion is preferably positioned at least 5 mm rearward of the forward-most end of the housing.

The laterally extending protrusion may have a forward-facing surface 154, 156 and a rearward-facing surface 158, 160. Preferably the forward-facing surface of the laterally extending protrusion is concave towards the forward end of the housing. The forward-facing surface and rearward-facing surface may not be parallel to one another. The rearward-facing surface of the laterally extending protrusion may taper inwardly towards the housing along a direction from the forward end to the rearward end of the housing.

Preferably the forward-facing surface of the laterally extending protrusion is transverse to a longitudinal axis 162 of the housing. More preferably, the forward-facing surface of the laterally extending protrusion is orthogonal to the longitudinal axis of the housing. The forward-facing surface may be parallel to a forward-facing surface of the forward end of the housing and/or a rearward-facing surface of the rearward end of the housing.

The laterally extending protrusion has a height 170, 172 measured along a direction from the bottom side of the housing to the top side of the housing. The laterally extending protrusion has a width 174, 176 measured along the forward-facing surface of the laterally extending protrusion and along a direction from the first lateral side of the housing to a second lateral side of the housing. And, the laterally extending protrusion has a length 178, 180 measured between the forward-facing surface and the rearward-facing surface along a direction from the rearward end of the housing to the forward end of the housing.

The height of the laterally extending protrusion is preferably greater than the width and the length of the protrusion. The length of the protrusion is preferably greater than the width of the protrusion. The laterally extending protrusion preferably has a maximum width of at least 1 mm.

Positioned forward of the laterally extending protrusion is a lead-in portion 190, 192. The lead-in portion preferably does not extend laterally outward beyond an outermost surface of the laterally extending protrusion. For example, the lead-in portion is preferably positioned laterally inward of an outermost surface of the protrusion. The lead-in portion is preferably free of protrusions having a height and/or width greater than 0.1 mm. The lead-in portion preferably has a surface roughness of less than 50 mm.

The lead-in portion may extend the entirety of the height of the laterally extending protrusion. The lead-in portion may extend only a portion of the height of the laterally extending protrusion. Preferably, the lead-in portion has a height 200 of at least 10 mm. More preferably the lead-in portion has a height of at least 15 mm.

The lead-in portion may be a planar surface. The lead-in surface may be parallel to the longitudinal axis of the housing.

The lead-in portion has a length 204, 206 measured along the direction from the forward end of the housing to the rearward end of the housing. The length of the lead-in portion is preferably at least 5 times the width of the laterally extending protrusion. More preferably, the length of the lead-in portion is preferably at least 6 times the width of the laterally extending protrusion. Preferably the lead-in portion has a length of at least 5 mm. More preferably, the lead-in portion has a length of at least 10 mm.

In embodiments comprising a lens, the housing preferably has a portion 210 that extends at least partially around the lens. Preferably the portion extending at least partially around the lens has a forward end 214, a rearward end 218, a top surface 222, a first lateral outer surface 226, and a second lateral outer surface 230. Preferably, the portion extending at least partially around the lens extends up and over the top of the lens.

The first and/or second lateral outer surface may include at least a first slope 234 extending downward and outward relative to the lens. The first lateral outer surface may also include a second slope 238 extending downward and inward relative to the lens. The second slope is preferably positioned below the first slope.

The housing preferably defines a battery cavity 250, one or more apertures 260, 262, 264, 266 for receiving one or more posts for aligning the housing to a firearm or an intermediate mounting plate, and/or one or more apertures 270, 274 for receiving one or more fasteners 280, 284 for securing the housing to the firearm or an intermediate mounting plate. The battery cavity is preferably accessible from the bottom side of the housing. The one or more apertures for posts are preferably accessible from the bottom side of the housing. And, the one or more apertures for fasteners are preferably accessible from the top side of the housing. Preferably, the battery cavity is preferably positioned between the one or more apertures for fasteners and the forward end of the housing.

The rearward end and/or rearward-facing side of the housing preferably includes serrations 300. The serrations preferably reduce glare that may be directed toward an eye of a shooter of the firearm (e.g., anti-glare serrations). The serrations may comprise a series of elongate peaks 304 separated by elongate valleys 336. The peaks may be truncated. Truncated peaks may define flat surfaces 308 extending parallel to the rearward end and/or rearward-facing side of the housing.

Peaks of the serrations may be defined by a first peak side surface 312 and a second peak side surface 316. The first and second peak side surfaces may be angled relative to one another. The first and second peak side surfaces may intersect. Preferably, the first and second peak side surfaces intersect at an angle of about 90 degrees. A side surface of one peak may intersect the side surface of an adjacent peak. Preferably, side surfaces of adjacent peaks intersect at an angle of about 90 degrees.

The peaks have a height 320 as measured along a direction orthogonal to the rearward end or rearward-facing side of the housing. The peaks may have a width 324 as measured along the rearward end or rearward-facing side along a direction from the bottom side of the housing to the top side of the housing. The height of the peaks may be less than or equal to the width of the peaks. Truncated peaks have a truncated surface having a width 328 as measured along the rearward end or rearward-facing side along a direction from the bottom side of the housing to the top side of the housing. Preferably the width of truncated surfaces is equal to or greater than the height of the truncated peaks.

Between the peaks are valleys. Preferably the width 332 of a valley 336 adjacent a peak is equal to the width of the adjacent peak. For example, the width of a valley as measured along the rearward end or rearward-facing side along a direction from the bottom side of the housing to the top side of the housing is approximately equal to the width of an adjacent truncated peak.

The serrations may extend along a direction extending from the first lateral side or lateral outer surface to the second lateral side or lateral outer surface. Elongate peaks of serrations extending along the direction extending from the first lateral side or lateral outer surface to the second lateral side or lateral outer surface have a length measured along the direction extending from the first lateral side or lateral outer surface to the second lateral side or lateral outer surface.

As viewed by an operator aiming a firearm with a disclosed sight (i.e., the view in FIG. 5) which may include the viewing of a reticle 360 of the sight, the rearward end and/or rearward-facing side of the housing preferably include(s) serrations positioned at least partially around the optical sighting element. Preferably serrations are positioned below the optical sighting element as seen by a shooter aiming the firearm. More preferably, serrations are positioned below and on opposing lateral sides of the optical sighting element as viewed by a shooter aiming the firearm. Even more preferably, serrations are positioned below, on opposing lateral sides, and above the optical sight element as viewed by a shooter aiming the firearm. Serrations are preferably located on all sides of the optical sight element as viewed by a shooter aiming the firearm.

Serrations preferably cover at least 60% of the housing as it is visible to an operator aiming a firearm with a disclosed sight. More preferably, serrations cover at least 80% of the housing visible to an operator aiming a firearm with a disclosed sight.

Serrations may be located at different locations along the length of the housing. Preferably, serrations below the optical sight element (as viewed by a shooter aiming the firearm) are positioned rearwardly (relative to the length of the housing) of serrations positioned laterally of the optical sight element. Even more preferably, serrations positioned above the optical sight element (as viewed by a shooter aiming the firearm) are positioned forward of serrations laterally of the optical sight element.

Serrations may be on non-coplanar surfaces of the housing. Preferably serrations are on surfaces that are oblique to one another. More preferably, the surfaces are oblique by an angle of at least 10 degrees relative to one another. For example, the rearward end 218 is preferably inclined an angle of at least 10 degrees relative to rearward end 124. In the illustrated embodiment, angle 380 shows an inclination of 15 degrees of rearward end 218 relative to the rearward end 124.

Figure 8:
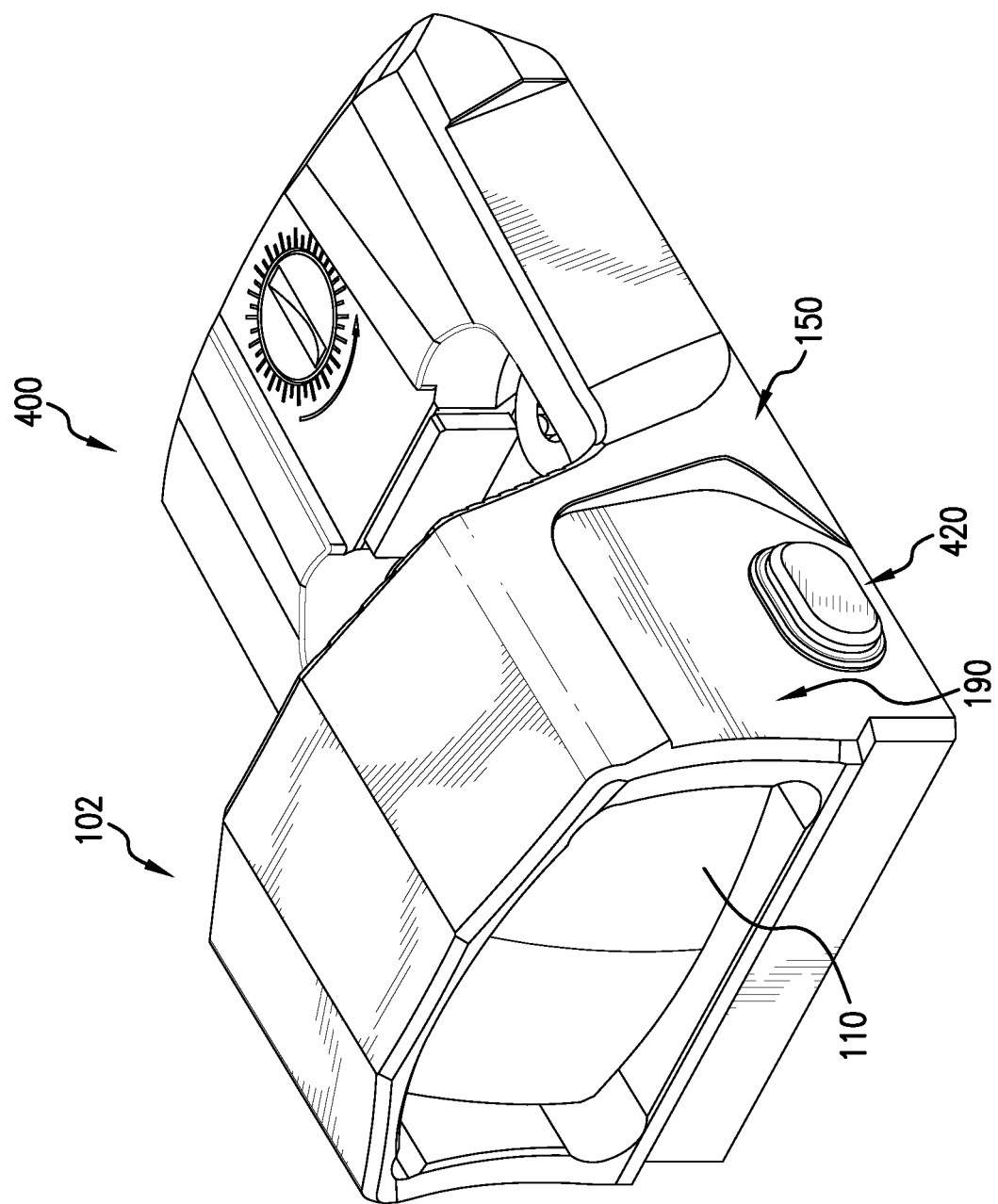
FIG. 8 illustrates a front left top perspective view of a sight for a firearm.
Figure 9:
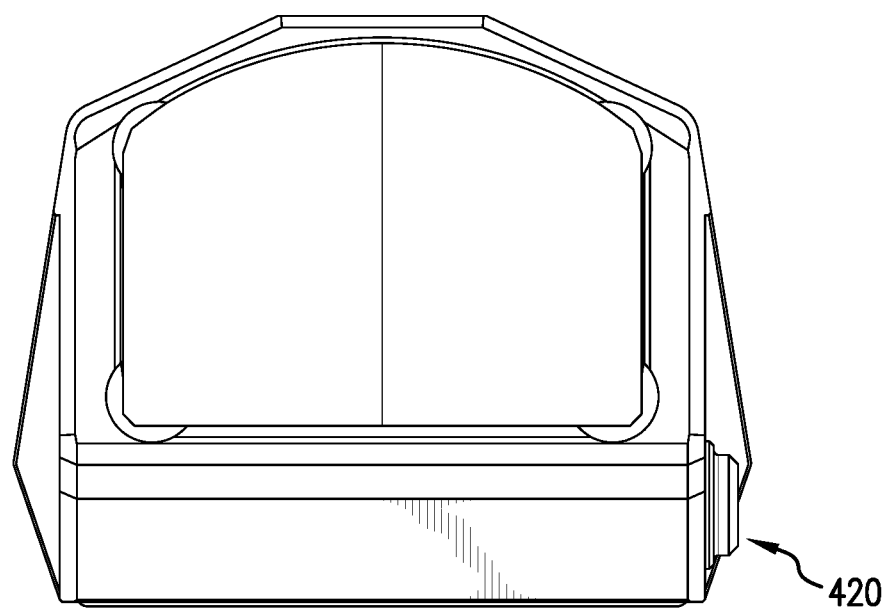
FIG. 9 illustrates a front view of the sight of FIG. 8.
Figure 10:
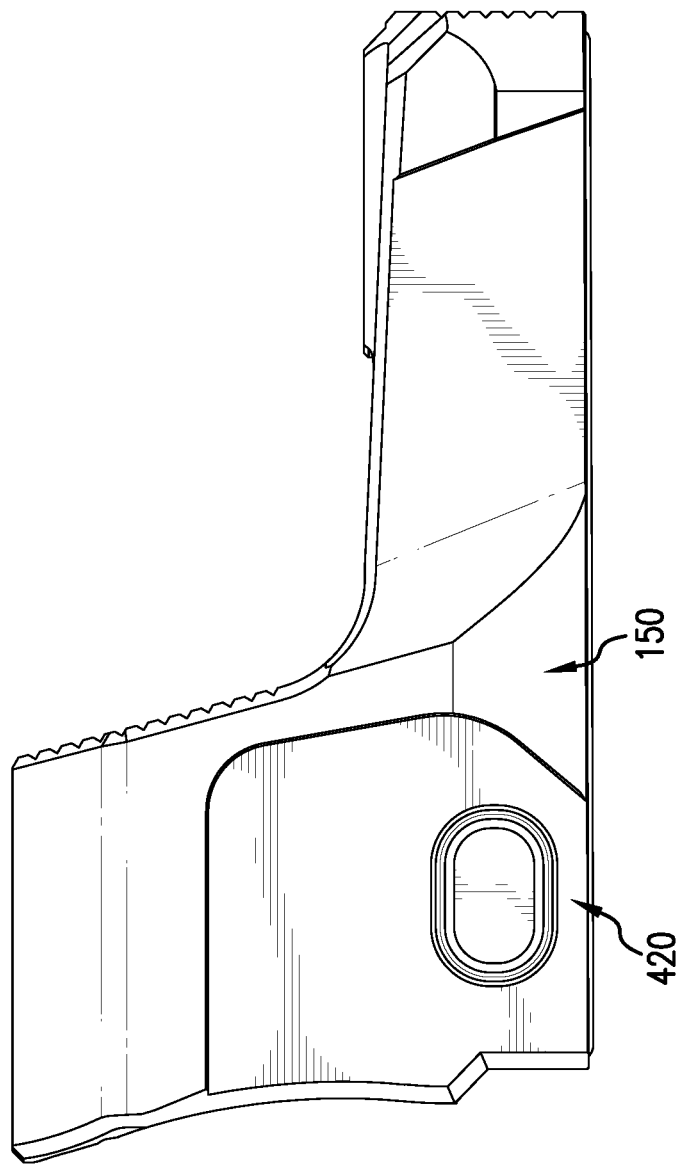
FIG. 10 illustrates a left side view of the sight of FIG. 8.
Figure 11:
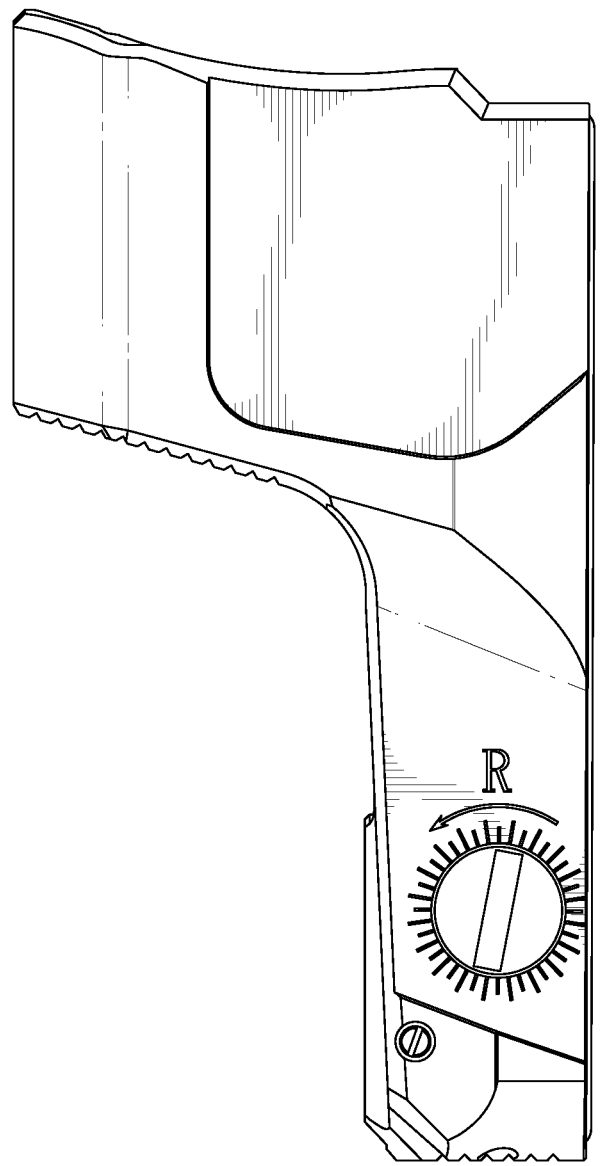
FIG. 11 illustrates a right side view of the sight of FIG. 8.
Figure 12:
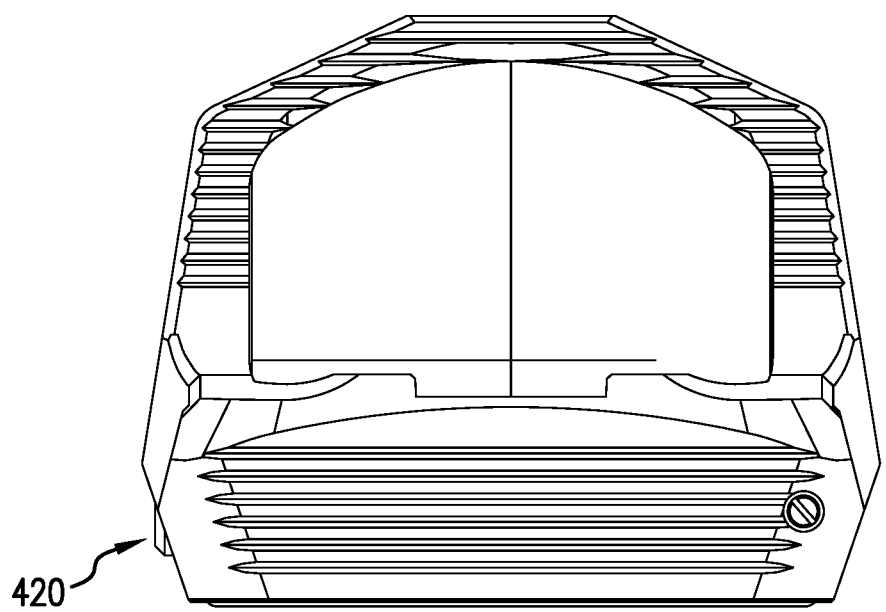
FIG. 12 illustrates a rear view of the sight of FIG. 8.
Figure 13:
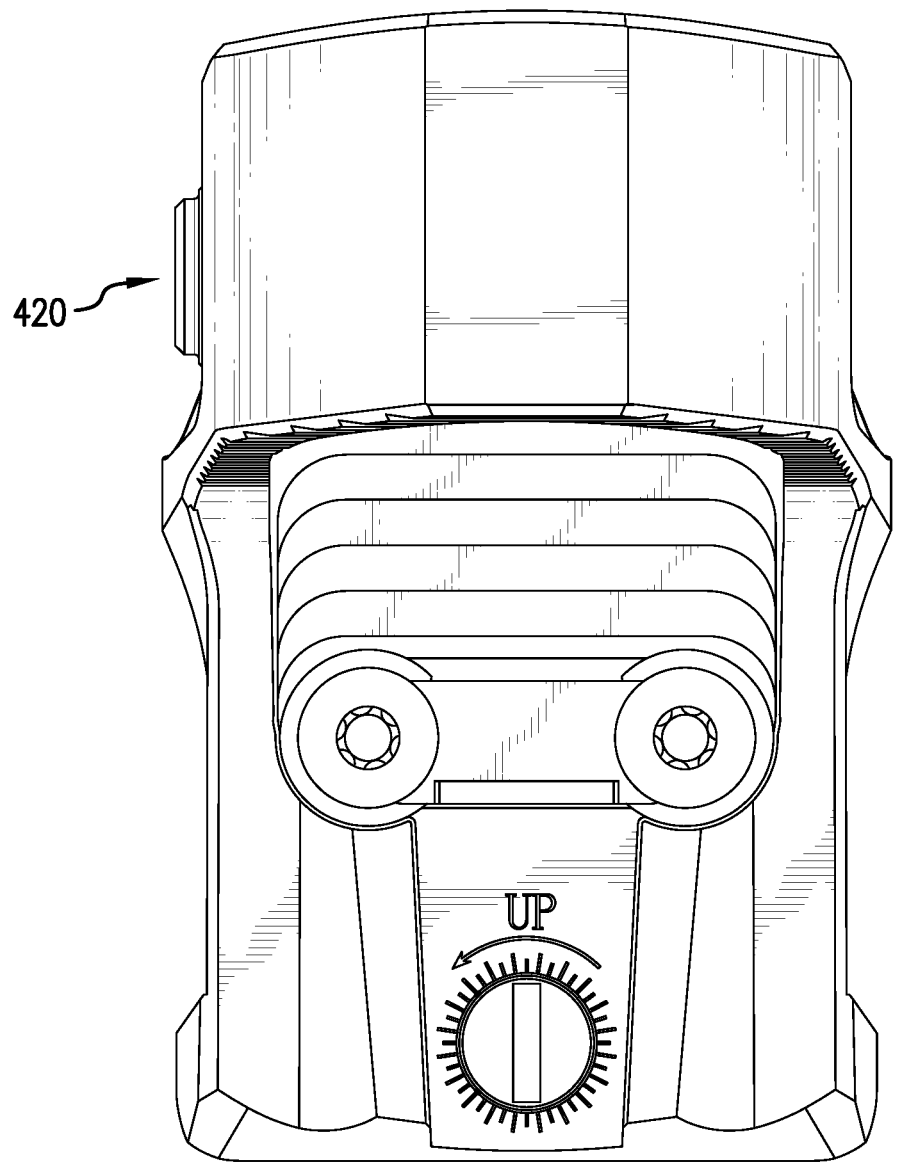
FIG. 13 illustrates the top of the sight of FIG. 8.

Serrations positioned at different locations and/or angles on the housing may have similar or different shapes and/or dimensions than other serrations. For example, serrations below the optical sight element may have the same peak height and/or width as serrations laterally of and/or above the optical sight element. Serrations positioned more rearwardly of the optical sight element may have a greater length than serrations nearer the optical sight element. FIGS. 8-13 illustrate another exemplary sight 400 similar to the sight illustrated in FIGS. 1-7 and described above. Sight 400 also includes a laterally-extending protrusion 150 and a lead-in portion 190. In contrast to the embodiment illustrated above, sight 400 includes a button 420 positioned below the lead-in portion 190. Button 420 can be configured to control a feature of the sight, such as the brightness of light being reflected from the lens 110. Preferably button 420 has a height and a width less than the corresponding height and width of the forward-facing surface of the laterally-extending protrusion.

Not limited to a particular embodiment, the housing may include laterally extending protrusions on one or both the first lateral side and the second lateral side. The first lateral side and/or second lateral side of the housing may include more than one laterally extending protrusion. Preferably, each laterally extending protrusion has a lead-in portion positioned forward of the laterally extending protrusion.

In arrangements having multiple laterally extending protrusions on the same lateral side of the housing, preferably the forward-facing surface of a first laterally extending protrusion is spaced at least 10 mm from the forward-facing surface of a second laterally extending protrusion on the same lateral side along the length of the housing. Preferably, at least one lead-in portion separates the first and second laterally extending protrusions of the multiple laterally extending protrusions.

The first and second lateral sides of the housing may include the same number of laterally extending protrusions or different numbers of laterally extending protrusions. Laterally extending protrusions on the first lateral side of the housing may be offset with laterally extending protrusions on the second lateral side of the housing. Preferably, however, a laterally extending protrusion on the first lateral side of the housing may align along the length of the housing with a laterally extending protrusion on the opposing, second lateral side of the housing.

In such instances, the maximum width of the housing at the aligned laterally extending protrusions on opposing sides of the housing is preferably about 10% greater than at a lead-in portion preceding the laterally extending protrusions. In arrangements having aligned laterally extending protrusions on opposing sides of the housing, preferably the maximum width of the housing at the aligned laterally extending protrusions is at least 2 mm greater than at a lead-in portion preceding the laterally extending protrusions.

Figure 14:
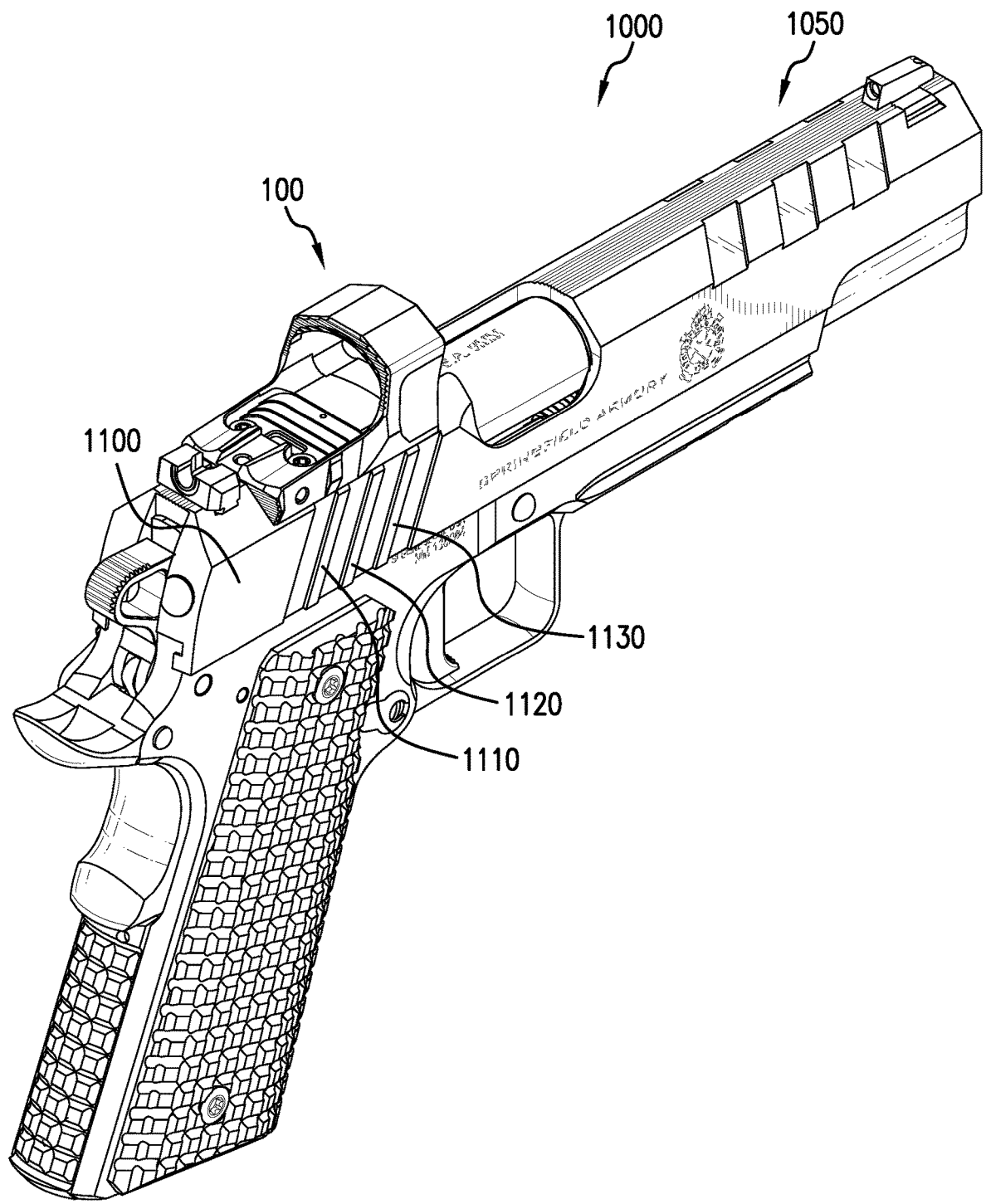
FIG. 14 illustrates a back right perspective of a firearm assembly with the sight of FIG. 1.
Figure 15:
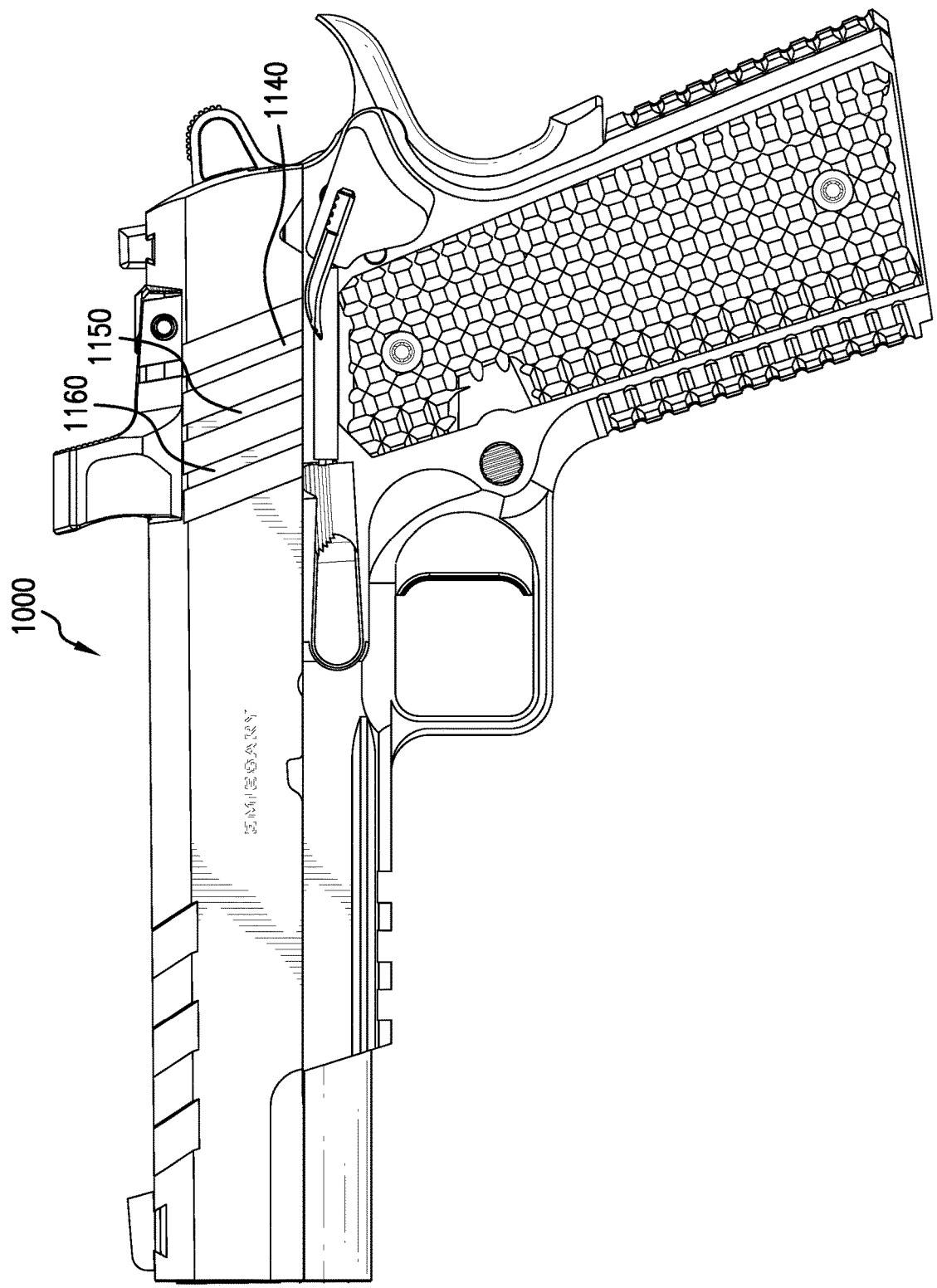
FIG. 15 illustrates a left side view of the assembly of FIG. 14.
Figure 16:
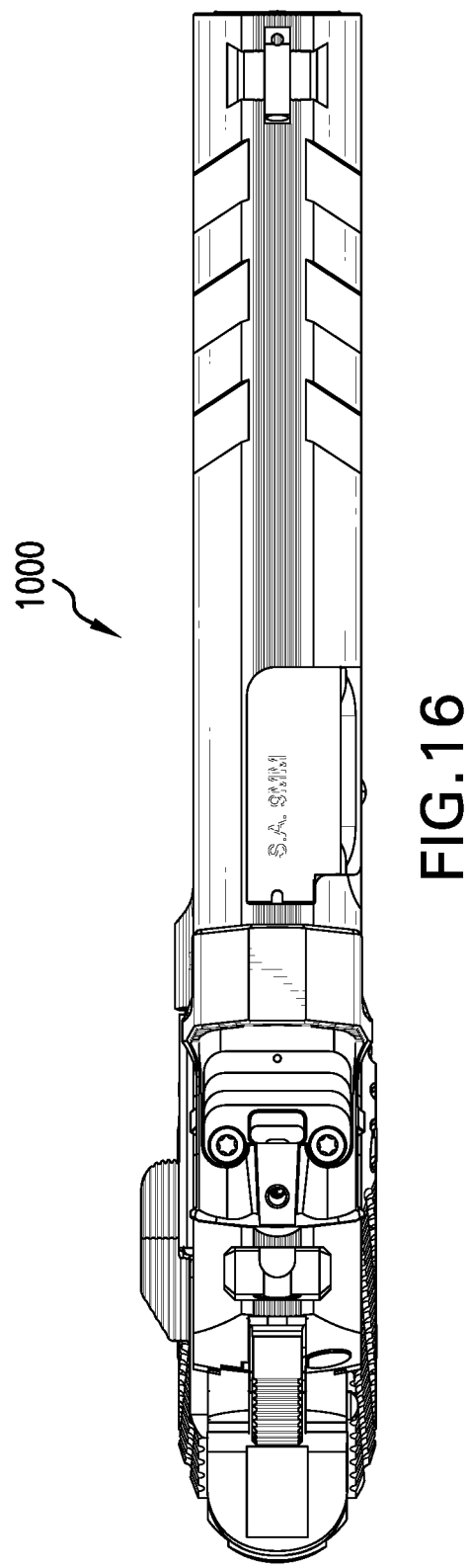
FIG. 16 illustrates a top view of the assembly of FIG. 14.
Figure 17:
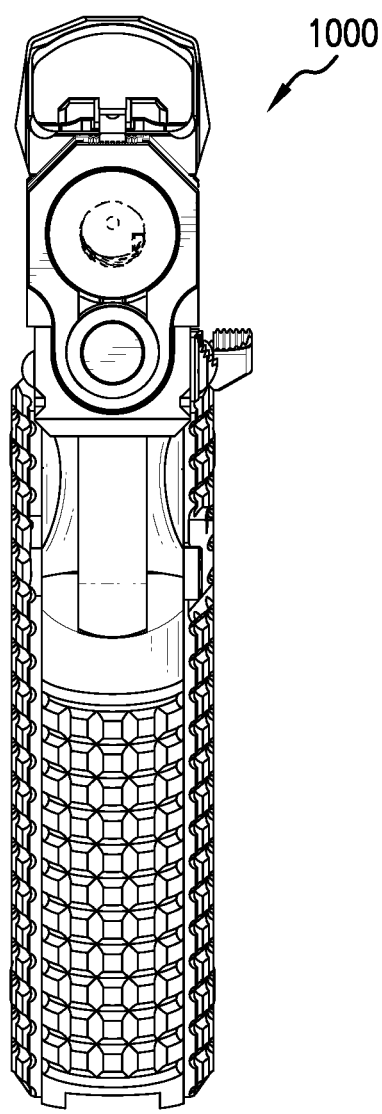
FIG. 17 illustrates the front of the assembly of FIG. 14.

FIGS. 14-17 illustrate an exemplary firearm assembly 1000 with a sight. The firearm assembly includes a firearm 1050. The firearm may have a reciprocating slide 1100. The slide may have one or more serrations 1110, 1120, 1130, 1140, 1150, 1160 and the sight may be mounted to the slide.

Firearm assemblies comprising the sights disclosed herein preferably have a laterally extending protrusion of the sight housing with a greater width than a corresponding width of a serration on a slide of the firearm assembly. Preferably, the laterally extending protrusion of the sight has a greater height than a corresponding height of the serration. Preferably, the laterally extending protrusion has a greater width and/or height than all of the serrations on the slide of the firearm. Preferably, the laterally extending protrusion extends laterally outward beyond the outermost surface of the serration. Advantageously, such arrangements can make it easier for an operator to grasp and, therefore, manually operate the slide of the firearm.

Firearm assemblies comprising the sights disclosed herein preferably have a laterally extending protrusion of the sight housing positioned above a serration on the slide of the firearm assembly. More preferably, the forward-facing surface of the laterally extending protrusion of the sight aligns with a forward-facing surface of the serration. For example, the forward-facing surface of the laterally extending portion preferably lies along an extension of the forward-facing surface of the serration. Similarly, the rearward-facing surface of the laterally extending protrusion of the sight preferably aligns with a rearward-facing surface of a serration.

The rearward-facing surface of the laterally extending protrusion may align with the rearward-facing surface of a serration in addition to the forward-facing surface of the laterally extending portion aligning with the forward-facing surface of either the same or a different serration.

The following numbered clauses set out specific embodiments that may be useful in understanding the present invention:

1. A sight for a firearm, comprising:
  a lens and a housing supporting the lens;
  wherein the housing has a forward end, a rearward end, a top side, a bottom side, a first lateral side, and a second lateral side;
  wherein the first lateral side extends between the forward and rearward ends and includes at least one laterally-extending protrusion having a height measured along a direction from the bottom side of the housing to the top side of the housing, a width measured along a direction from the first lateral side of the housing to the second lateral side of the housing, and a length measured along a direction from the rearward end of the housing to the forward end of the housing;
  wherein the first lateral side has a lead-in portion having a length measured along a distance from the forward end of the housing to the rearward end of the housing, the length of the lead-in portion being at least five times the width of the laterally-extending protrusion and extending forward from the laterally-extending protrusion;
  wherein the lead-in portion is positioned laterally-inward of an outermost surface of the laterally-extending protrusion; and
  wherein the lead-in portion has a surface roughness of less than 50 μm.
2. The sight of clause 1, wherein the height of the laterally-extending protrusion is greater than the width and the length of the laterally-extending protrusion.
3. The sight of any preceding clause, wherein the length of the laterally-extending protrusion is greater than the width of the laterally-extending protrusion.
4. The sight of any preceding clause, wherein the laterally-extending protrusion has a forward-facing surface and a rearward-facing surface; and
  wherein the forward-facing surface is concave towards the forward end of the housing.
5. The sight of any preceding clause, wherein the length of said lead-in portion is at least six times the width of said laterally-extending protrusion.
6. The sight of any preceding clause, wherein the laterally-extending protrusion has a maximum width of at least 1 mm.
7. The sight of any preceding clause, wherein the lead-in portion is free of protrusions having a height greater than 0.1 mm.
8. The sight of any preceding clause, wherein the laterally-extending protrusion is positioned between the lens and the rearward end of the housing.
9. The sight of any preceding clause, wherein the housing defines a battery cavity.
10. The sight of any preceding clause, wherein the sight is a reflex optic.
11. A sight for a firearm, comprising:
  a lens and a housing supporting the lens;
  wherein the housing has a forward end, a rearward end, a top side, a bottom side, a first lateral side, and a second lateral side;
  wherein the first lateral side extends between the forward and rearward ends and includes a first laterally-extending protrusion having a height measured along a direction from the bottom side of the housing to the top side of the housing, a width measured along a direction from the first lateral side of the housing to the second lateral side of the housing, and a length measured along a direction from the rearward end of the housing to the forward end of the housing;
  wherein the height of the first laterally-extending protrusion is greater than the width and the length;
  wherein the first lateral side has a lead-in portion having a length measured along a distance from the forward end of the housing to the rearward end of the housing, the length of the lead-in portion being at least five times the width of the laterally-extending protrusion and extending forward from the laterally-extending protrusion; and
  wherein the first laterally-extending protrusion has a maximum width of at least 1 mm positioned at least 5 mm rearward of the forward end.
12. The sight of clause 11, wherein the length of the first laterally-extending protrusion is greater than the width.
13. The sight of clause 11 or clause 12, wherein the first laterally-extending protrusion has a forward-facing surface and a rearward-facing surface; and wherein the forward-facing surface is concave towards the forward end of the housing.
14. The sight of any one of clauses 11 to 13, wherein the lead-in portion does not extend laterally outward beyond an outermost surface of the laterally-extending protrusion.
15. The sight of any one of clauses 11 to 14, wherein the length of said lead-in portion is at least six times the width of said first laterally-extending protrusion.
16. The sight of any one of clauses 11 to 15, wherein the lead-in portion is free of protrusions having a height greater than 0.1 mm.
17. The sight of any one of clauses 11 to 16, wherein the first laterally-extending protrusion is positioned between the lens and the rearward end of the housing.
18. The sight of any one of clauses 11 to 17, wherein the housing defines a battery cavity.
19. The sight of any one of clauses 11 to 18, wherein the sight is a reflex optic.
20. A sight for a firearm, comprising:
  a lens and a housing supporting the lens;
  wherein the housing includes at least one laterally-extending protrusion extending from a side of the housing;
  wherein said laterally-extending protrusion includes a forward-facing surface and a rearward-facing surface; and
  wherein said forward-facing surface of the laterally-extending protrusion is not parallel with said rearward-facing surface.
21. The sight of clause 20, wherein said forward-facing surface is concave towards a forward end of the sight.
22. A sight for a firearm, comprising:
  a lens and a housing supporting the lens;
  wherein the housing has a portion extending up and over the lens, the portion having a forward end, a top surface, a first lateral outer surface, and a second lateral outer surface;
  wherein the first lateral outer surface includes at least one laterally-extending protrusion; and
  wherein the at least one laterally-extending protrusion includes defines a first slope extending downward and outwards relative to the lens and a second slope extending downward and inward relative to the lens and positioned below the first slope.
23. A firearm assembly, comprising:
  a firearm having a firearm slide with at least one serration having a forward-facing surface;

a sight coupled to the firearm slide, the sight having at least laterally-extending protrusion with a forward-facing surface;

wherein the forward-facing surface of the laterally-extending protrusion aligns with the forward-facing surface of the serration of the slide.

24. A firearm sight, comprising:

a housing having a rearward end, a forward end, and bottom side, and a top side; and an optical sighting element comprising a lens supported by the housing;

wherein the housing has a portion that extends at least partially around a perimeter of the lens; and wherein said portion has a rearward-facing side and a forward-facing side, the rearward-facing having serrations.

25. The sight of clause 24, wherein the serrations are positioned around at least half of the perimeter of the lens.

26. The sight of clause 24 or 25, wherein the rearward-facing side is positioned rearwardly of the lens.

27. The sight of any one of clauses 24-26, wherein the rearward-facing side is oblique to the bottom side of the housing.

28. The sight of any one of clauses 24-27, wherein serrations positioned above the lens are positioned forward of serrations positioned laterally outward of the lens.

29. The sight of any one of clauses 24-28, wherein the serrations comprise elongate peaks having lengths, widths, and heights.

30. The sight of clause 29, wherein the lengths of the elongate peaks extend along a direction extending from a first lateral outer surface of the housing to a second lateral outer surface of the housing.

31. The sight of clause 29 or 30, wherein elongate peaks are separated by valleys; and wherein the valleys have widths equal to the widths of adjacent peaks.

32. The sight of any one of clauses 24-31, wherein the peaks are truncated.

33. The sight of any one of clauses 24-32, wherein the forward-facing side of the portion is free of serrations.

34. The sight of any one of clauses 24-33, wherein the top side of the housing is free of serrations.

35. The sight of any one of clauses 24-34, wherein the rearward end of the housing has serrations.

36. The sight of clause 35, wherein peaks of the serrations of the rearward end have the same width as peaks of the serrations of the rearward-facing side.

37. The sight of clause 35, wherein the serrations of the rearward end have lengths greater than lengths of serrations of the rearward-facing side.

38. A firearm sight, comprising:

a housing having a rearward end, a forward end, and bottom side, and a top side; and an optical sighting element comprising a lens;

wherein the housing has a first rearward-facing surface having serrations and a second rearward-facing surface having serrations; and wherein the second rearward-facing surface is not co-planar with the first rearward-facing surface.

39. The firearm sight of clause 38, wherein the first rearward-facing surface having serrations and the second rearward-facing surface having serrations are oblique to one another.

40. The firearm sight of clause 38 or 39, wherein the second rearward-facing surface is spaced from the first rearward-facing surface.

41. The firearm sight of any one of clauses 38-40, wherein the second rearward-facing surface is spaced rearwardly of the first rearward-facing surface.

42. The firearm sight of any one of clauses 38-41, wherein the second rearward-facing surface is at the rearward end of the housing.

43. The firearm sight of any one of clauses 38-42, wherein the second rearward-facing surface is perpendicular to the bottom side of the housing.

44. The firearm sight of any one of clauses 38-43, wherein the first rearward-facing surface extends at least partially around a perimeter of the lens.

45. The firearm sight of any one of clauses 38-44, wherein the serrations of the first rearward-facing surface comprise truncated peaks defining truncated peak surfaces.

46. The firearm sight of clause 45, wherein the serrations of the second rearward-facing surface comprise truncated peaks defining truncated peak surfaces; and wherein the truncated peak surfaces of the second rearward-facing surface are oblique to the truncated peak surfaces of the first rearward-facing surface.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. A firearm sight, comprising:
a housing having a rearward end, a forward end, and bottom side, and a top side; and
an optical sighting element comprising a lens supported by the housing;
wherein the housing has a portion that extends at least partially around a perimeter of the lens and to a first height above the bottom side;
wherein the top side at the rearward end is a second height above the bottom side, the second height being less than the first height;
wherein said portion has a rearward-facing side and a forward-facing side, the rearward-facing side having serrations and being separate from and spaced forward of said rearward end, and the forward-facing side being free of serrations.

2. The sight of claim 1, wherein the rearward-facing side is positioned rearwardly of the lens.

3. The sight of claim 1, wherein the rearward-facing side is oblique to the bottom side of the housing.

4. The sight of claim 1, wherein serrations positioned above the lens are positioned forward of serrations positioned laterally outward of the lens.

5. The sight of claim 1, wherein the serrations comprise elongate peaks having lengths, widths, and heights.

6. The sight of claim 5, wherein the lengths of the elongate peaks extend along a direction extending from a first lateral outer surface of the housing to a second lateral outer surface of the housing.

7. The sight of claim 5, wherein elongate peaks are separated by valleys; and
wherein the valleys have widths equal to the widths of adjacent peaks.

8. The sight of claim 1, wherein the peaks are truncated.

9. The sight of claim 1, wherein the top side of the housing is free of serrations.

10. The sight of claim 1, wherein the rearward end of the housing has serrations.

11. The sight of claim 1, wherein peaks of the serrations of the rearward end have the same width as peaks of the serrations of the rearward-facing side.

12. The sight of claim 1, wherein the serrations of the rearward end have lengths greater than lengths of serrations of the rearward-facing side.

13. The firearm sight of claim 1, wherein the firearm sight has a total rearward-facing surface area, and a portion of said total rearward-facing surface area is free of serrations.

14. A firearm sight, comprising:
a housing having a rearward end, a forward end, and bottom side, and a top side; and
an optical sighting element comprising a lens;
wherein the housing has a first rearward-facing surface having serrations and a second rearward-facing surface having serrations, the second rearward-facing surface being separate from and spaced rearwardly of the first rearward-facing surface;
wherein the forward-facing side is free of serrations; and
wherein the second rearward-facing surface angled relative to the first rearward-facing surface.

15. The firearm sight of claim 14, wherein the first rearward-facing surface having serrations and the second rearward-facing surface having serrations are oblique to one another.

16. The firearm sight of claim 14, wherein the second rearward-facing surface is at the rearward end of the housing.

17. The firearm sight of claim 14, wherein the second rearward-facing surface is perpendicular to the bottom side of the housing.

18. The firearm sight of claim 14, wherein the first rearward-facing surface extends at least partially around a perimeter of the lens.

19. The firearm sight of claim 14, wherein the serrations of the first rearward-facing surface comprise truncated peaks defining truncated peak surfaces.

20. The firearm sight of claim 19, wherein the serrations of the second rearward-facing surface comprise truncated peaks defining truncated peak surfaces; and wherein the truncated peak surfaces of the second rearward-facing surface are oblique to the truncated peak surfaces of the first rearward-facing surface.

21. A firearm sight, comprising:
a housing having a rearward end, a forward end, and bottom side, and a top side;
wherein the top side at a forward portion has a first height above the bottom side;
wherein the top side at a rearward portion has a second height above the bottom side, the second height being less than the first height;
wherein said forward portion has a rearward-facing side and a forward-facing side, the rearward-facing side having serrations and the forward-facing side being free of serrations; and
wherein said rearward portion has a rearward-facing side having serrations and that is separate from and spaced rearwardly of the rearward-facing side of the forward portion.

22. A firearm comprising the firearm sight of claim 1.

23. A firearm comprising the firearm sight of claim 14.

* * * * *